United States Patent [19]

Uchiyama et al.

[11] 3,720,152
[45] March 13, 1973

[54] ELECTRONIC EXPOSURE CONTROL APPARATUS FOR A CAMERA

[75] Inventors: Takashi Uchiyama; Kanehiro Sorimachi, both of Yokohama, Japan

[73] Assignee: Canon Kabushiki Kaisha, Tokyo, Japan

[22] Filed: May 13, 1970

[21] Appl. No.: 36,953

[52] U.S. Cl..............95/53 EB, 95/10 CT, 95/53 E
[51] Int. Cl...............................................G03b 9/62
[58] Field of Search....................95/53 EB, 10 CT

[56] References Cited

UNITED STATES PATENTS

| | | | |
|---|---|---|---|
| 3,437,026 | 4/1969 | Espig | 95/53 EB |
| 3,548,732 | 12/1970 | Rentschler | 95/10 CT |

Primary Examiner—John M. Horan
Assistant Examiner—Russell E. Adams, Jr.
Attorney—McGlew and Toren

[57] ABSTRACT

In the electronic exposure control apparatus disclosed the shutter blades also serve as diaphragm blades. An actuating mechanism moves the shutter blades in response to a shutter release. At the same time, the actuating mechanism or shutter release starts charging a capacitor on the basis of the response of a photocell to ambient light. When the capacitor reaches a given state of charge an electric circuit constrains the actuating mechanism to stop the blades from opening and to reclose. A lock device in the actuating mechanism holds the release in the position in which it causes the actuating mechanism to start opening the blades until the electric circuit constrains the the actuating mechanism to reclose the blades.

2 Claims, 5 Drawing Figures

INVENTOR.
TAKASHI UCHIYAMA
KANEHIRO SORIHACHI
BY
ATTORNEYS

ELECTRONIC EXPOSURE CONTROL APPARATUS FOR A CAMERA

The present invention relates to an electronic exposure control apparatus for a camera, and particularly to an apparatus wherein a shutter blade also functions as a diaphragm blade.

In a camera in which a shutter release mechanism closes the main switch of a timer, the release mechanism may accidently open the main switch before the timer has completed its function. This is because the photographer may take his finger off the release mechanism and a spring may restore the release mechanism to its original position before the end of the timing function. This danger is particularly prevalent during long time exposures.

One of the objects of the present invention is to overcome the above disadvantage. For this purpose a lock means for holding the shutter release mechanism in a state of actuating a means for starting the shutter opening is provided. Instead of the lock means an auxiliary switch in parallel with the main switch is provided for the same purpose.

The present invention will be described referring to the attached drawings in which.

Figure 1:
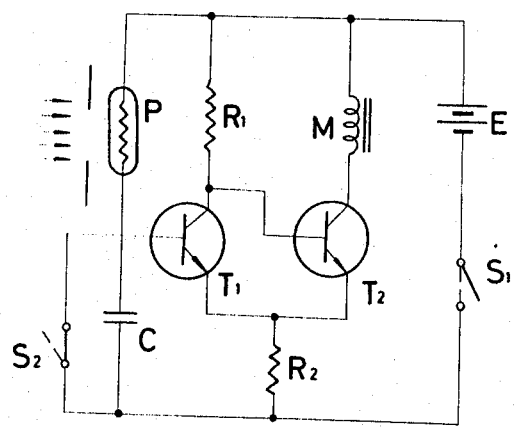
FIG. 1 shows a timer circuit applicable to the present invention.

In FIG. 1, P is a photo-resistor, C is a capacitor, $T_1$ and $T_2$ are transistors, M is an electro-magnet, $R_1$ and $R_2$ are resistors, E is a battery, $S_1$ is a main switch and $S_2$ is a start switch for the timer circuit.

Figure 2:
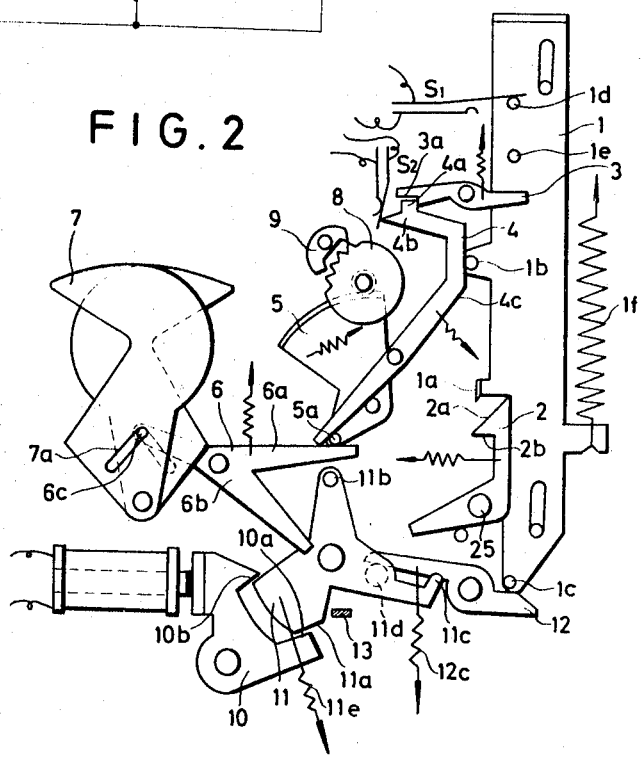
FIG. 2 is a schematic view of one embodiment of the present invention.

FIG. 2 shows an apparatus with two shutter blades 7 which also serve as diaphragm blades in a shutter-ready state. Each of the two blades 7 with a slot 7a is pivoted coaxialy on an axle $7_3$ and actuated by an actuating means 6 with a pin 6c through a pin-slot engagement.

The actuating means 6 engages a pin 5a on a sector gear 5 of a mechanical govener. by a lever 4 engaged with a hook lever 3 so as to close the shutter blades in a shutter-ready state.

When the shutter is released, the pin 5a disengages from the lever 4 and the actuating means 6 actuates slowly in a constant speed to open the shutter blades 7 through the mechanical governer. The latter comprises the sector gear 5, an anchor gear 8 and an anchor escape 9. A shutter release means 1 moves up and down in association with a shutter button and is biased upwardly by a spring with its one end fixed as shown in FIG. 2. When the shutter release means 1 is pushed down to a first position, the main switch $S_1$ held open by a pin 1d on the release means 1 is closed when the release means 1 is further pushed down to a second position, a projection 1a of the release means 1 passes over a slope 2a of a lock means 2 pivoted on an axle 25. When the release means 1 is still further pushed down to a third position, a pin 1e mounted on the release means 1 constrains the hook lever 3 to rotate in a clockwise direction to free a stepped portion 4a of the lever 4 from the engagement with a stepped portion 3a of the hook lever 3. The lever 4 is rotated in a clockwise direction by a spring to start the sector gear 5 to rotating slowly in a clockwise direction. The actuating means 6 rotates in a counter-clockwise direction to follow the pin 5a, thus opening the blades 7. When the shutter release means 1 is released from being pushed down at the third position, the release means 1 is biased to return back by the spring. However the projection 1a of the release means 1 is engaged with a jaw 2b of the lock means 2 so that the release means 1 is held in a locked position to maintain the closed state of the switch $S_1$.

When the hook lever 3 disengages from the lever 4, the start switch $S_2$ held closed by an end 4b of the lever 4 is opened to start the timer circuit. As the electromagnet M is energized by the closure of the main switch $S_1$, a controller means CM, comprising members 10, 11 and 12 for controlling the shutter closure, is held in a charged state as shown in FIG. 2. After the start switch $S_2$ is opened and after a lapse of an appropriate period of time corresponding to the brightness of an object, the electro-magnet M is deenergized to liberate the controller means CM. Before the liberation of the controller means CM a charge member 13 for the controller means CM, which is brought to the position shown in FIG. 2 by a film winding mechanism, is pushed from the path of the member 11 by the shutter release means.

In this way in the shutter-ready state the controller means CM is held at the charged position as the member 12 biased by a spring 12c rotates in a counter-clockwise direction and pushes down the pin 11d and the member 11 pushes the member 10 against the electro-magnet M. In the process of the shutter actuation, the controller means CM is attracted and held at the charged position by the energization of the electro-magnet M.

When the electromagnet M is deenergized, the member 10 is rotated in a clockwise direction by the control member 11 biased by a tension of a charge spring 11e. A control pin 11b mounted on the control member 11 engages one leg 6b of the actuating means 6 in the course of its counter-clockwise rotation and rotates the actuating means 6 in a clockwise direction. This starts the shutter closing. An end 11c of the control member 11 rotates the lock means 2 in a clockwise direction around the axle 25 to disengage the projection 1a of the shutter release means 1. This permits the return of the release means 1.

When the shutter release means 1 starts to return the lever 4 is rotated in a counter-clockwise direction by a pin 1b on the release means 1 through its engagement with a slope 4c of the lever 4. By the rotation of the lever 4, one end of the lever 4 pushes down the pin 5a on the sector gear 5. This charges the sector gear 5 in a counter-clockwise direction, and the stepped portion 4a of the lever 4 engages the stepped portion 3a of the hook lever 3. The member 12 held pushed-down by a pin 1c at the lower end of the shutter release means 1 rotates in a counter-clockwise direction by means of the spring 12c and pushes down the pin 11d of the member 11. The member 11 moves upward, energizing the spring 11e, and pushes the member 10 against the electro-magnet M. Return of the shutter release means 1 opens, the main switch $S_1$ again and closes the start switch $S_2$. Member 13 is a lever for preventing an idle fild winding, which is moved right and left by the member 11.

Figure 3:
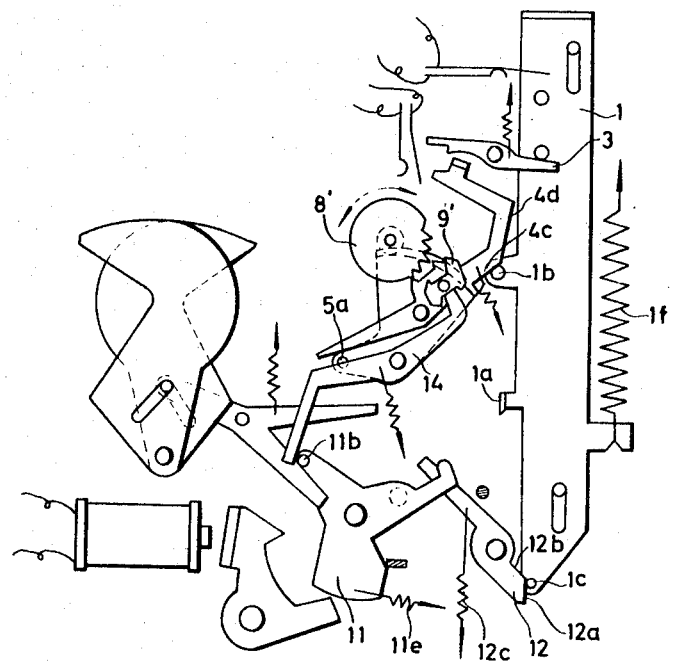
FIG. 3 is a similar schematic view of other embodiment of the present invention.

FIG. 3 shows another embodiment of the present invention in which a mechanical governer is used in stead of the lock means 2 of the embodiment shown in FIG. 2 for preventing the return of the shutter release means 1. Member 14 is a lever having an anchor 9' mounted on one end thereof. The other end of the lever 14 is engageable with a pin 11b of the member 11. The anchor 9' and the anchor gear 8' operate so that the anchor gear 8' is rotatable in a counter-clockwise direction with a constant speed, but is not rotatable in a clockwise direction. Except for the above, the explanation set forth regarding FIG. 2 is also applicable here.

When the shutter button is released from the force of the hand before the closing of the shutter blades, pin 1b of the shutter release means 1 tends to push up the slope 4c of the lever 4. However the counter-clockwise rotation of the pin 5a of the sector gear 5 engaged with the lever 4 is prevented by the engagement of the anchor 9' with the anckor gear 8'. The shutter release means 1 is thus not permitted to return. In this locked state, when the control member 11 is released it rotates in a counter-clockwise direction due to the deenergization of the electro-magnet M. The pin 11b rotates the lever 14 in a clockwise direction. The anchor 9' departs from the anchor gear 8' so as to permit the pin 5a to rotate in a counter-clockwise direction. Thus the shutter release means 1 which has been hindered by the slope 4c returns back by means of a spring. The pin 1c contacts with a vertical surface 12a until the pin 1b passes the slope 4c. After the pin 1b moves to contact the vertical surface 4d, the pin 1c removes to contact a stepped portion 12b. Thus the member 12 rotates in a counter-clockwise direction. This rotates the control member 11 in a clockwise direction. This engages the anchor 9' with the anchor gear 8' so that the release means 1 is not locked again during the engagement of the pin 1b with the slope 4c. When the member 1 returns to its original position, all the members are reset in their original shutter-ready positions as in the embodiment shown in FIG. 2.

In FIG. 2, as the jaw 2b of the lock means 2 contacts the upper surface of the projection 1a of the release means 1 under pressure due to a spring 1f, a large force is necessary to release the lock means 2. For this purpose, the spring 11e for the control member should be strong enough to apply the large force and the spring 12c for the member 12 should be strong enough to return the control member 11. Thus a large force is required to push down the release means 1. However, the embodiment shown in FIG. 3 has a simplified structure and yet a strong force such as that needed in the embodiment at FIG. 2 is not necessary to effect successful shutter operation.

The embodiment shown in FIG. 3 has the advantage that the release means 1 returns back quickly since the anchor 9' is disengaged from the anchor gear 8' at the time of return of the release means 1.

Figure 4:
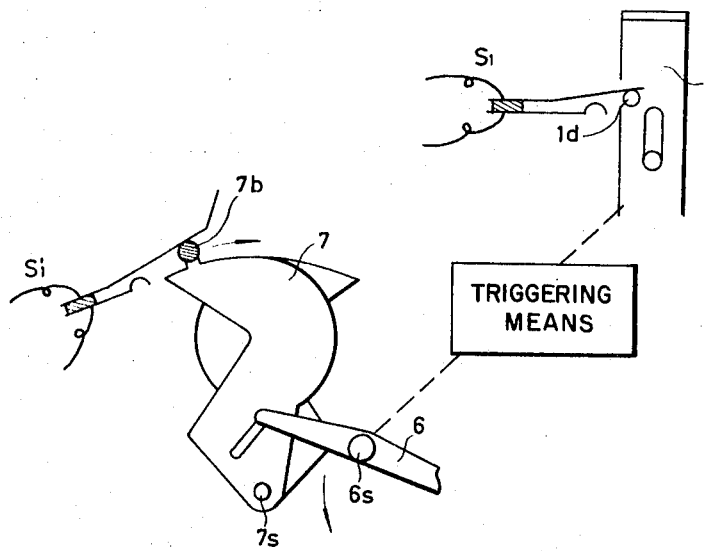
FIG. 4 is a schematic view of main portion of a still another embodiment of the present invention.

FIG. 4 shows still another embodiment of the present invention in which an auxiliary switch is provided in parallel with the main switch. A switch actuator is provided on the shutter blade, and the auxary switch is closed before the start switch is actuated by the switch actuator.

In FIG. 4 member, $S_1$ is the main switch and $S_1'$ is the auxiary switch, and 7b is the switch actuator fixed to the shutter blade 7. The members given same reference numerals as in the embodiments in FIGS. 2 and 3 function in the same way as in FIGS. 2 and 3. The members which are shown in FIGS. 2 and 3, but not shown in FIG. 4 may also be employed in FIG. 4 or may be replaced with other simplified similar members. However the lock means 2 in FIG. 2 and a lock mechanism 8' and 9' in FIG. 3 are not necessary in this embodiment. Instead the auxary switch $S_1$ is provided.

Figure 5:
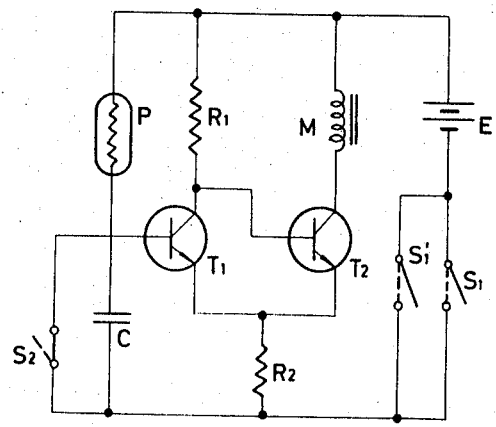
FIG. 5 is a timer circuit applicable to the embodiment shown in FIG. 4.

FIG. 5 shows a timer circuit applicable to this embodiment. The main switch $S_1$ of a normally-closed type is maintained open in the shutter-ready state by an insulating pin 1d mounted on the shutter release means 1. When the release means 1 is pushed down the main switch $s_1$ is closed. When the release means 1 is further pushed down, a triggering means (not shown) is activated by the release means 1 to start the rotation in a direction shown by arrow of the actuating means 6. Thus the shutter blades which engage with the actuating means 6 by a pin-slot engagement rotate around the axle 7s to open the shutter. In association with the triggering means, the start switch $S_2$ is opened to start the timer. The electro-magnet M continues to attract the actuating means 6 to maintain the shutter open.

After the lapse of time determined by the resistance of a photo-resistor P and the capacitance of a capacitor C, namely at the time when an appropriate exposure is assured, the electro-magnet M is deenergized to start the shutter closure. The blade 7 has an insulating pin 7b at its one end, and in the shutter-ready state the pin 7b maintains open the auxary switch $S_1'$ provided in parallel with the main switch $S_1$. When the shutter begins to open, the pin 7b moves in a direction shown by an arrow to close the auxiliary switch $S_1'$, so that the timer circuit is held in an activated state even if the main switch $S_1$ is opened when the release means 1 is released. Thus there is no disadvantage in that the shutter actuation stops.

The auxiliary switch $S_1'$ may be provided at other positions so far as it can be closed before the shutter opens.

While embodiments of the invention have been described in detail it will be obvious to those skilled in the art that the invention may be embodied otherwise without departing from its spirit and scope.

What is claimed is:

1. An electronic exposure control apparatus for a camera comprising a shutter blade which functions as a diaphram blade, an actuating member coupled to said shutter blade for opening the shutter blade, a timer circuit, an electro-magnet responsive to said timer circuit, controller means responsive to said electromagnet for constraining said actuating member to close the shutter blade, triggering means connected to said actuating member for constraining the actuating member to start opening the shutter blade, a starter switch in said timer circuit, an energizing switch in said timer circuit, and shutter release means movable from a first position to a second position for actuating said triggering means and said starter switch as well as said energizing switch, said triggering means including a mechanical governor, said mechanical governor being rotatable in one direction, said mechanical governor including means for holding said shutter release means in the second position and means for causing said governor to cause said release means to return to the first position in response to operation of said electro-magnet.

2. An electronic exposure control apparatus for a camera, comprising openable and closable shutter blade means, shutter release means movable to a release position, actuating means responsive to said shutter release means being in the release position for opening said shutter blade means, photoelectric circuit means responsive to ambient light into said release means for producing a signal responsive to the total light reaching a predetermined value after opening of said shutter blade means, said actuating means including closure means for initiating closure of said blade means in response to the signal from said circuit means, rotatable governor means connected to said actuating means for controlling the speed at which said actuating means opens said blade means, said governor means being rotatable in one direction, said actuating means including an actuating member responsive to the position of said blade means, said member being movable from an inactive position when said release means is unactuated to an active position when said release means is in the release position, said member having a surface for blocking return of said release means to the unreleased position until said circuit means produces the signal.

* * * * *